US008731282B1

(12) United States Patent
Schink (10) Patent No.: US 8,731,282 B1
(45) Date of Patent: May 20, 2014

(54) SYSTEMS AND METHODS FOR REGION OF INTEREST BACKGROUND SMOOTHING AND COMPRESSION ENHANCEMENT

(71) Applicant: DIVX, LLC, Santa Clara, CA (US)

(72) Inventor: Martin Schink, Aachen (DE)

(73) Assignee: Sonic IP, Inc., Santa Clara, CA (US)

( * ) Notice: Subject to any disclaimer, the term of this patent is extended or adjusted under 35 U.S.C. 154(b) by 0 days.

(21) Appl. No.: 13/797,829

(22) Filed: Mar. 12, 2013

Related U.S. Application Data

(60) Provisional application No. 61/771,009, filed on Feb. 28, 2013.

(51) Int. Cl.
*G06K 9/00* (2006.01)
(52) U.S. Cl.
USPC ........... 382/162; 382/167; 382/260; 382/173; 382/232; 382/236
(58) Field of Classification Search
USPC ......... 382/162, 167, 173, 260, 232, 240, 236, 382/194, 190, 245, 246; 375/240.02, 375/240.15, 240.16; 358/3.01, 3.23; 345/596, 690, 694, 697
See application file for complete search history.

(56) References Cited

U.S. PATENT DOCUMENTS

| | | | |
|---|---|---|---|
| 6,907,079 B2 | 6/2005 | Gomila et al. | |
| 6,922,492 B2 | 7/2005 | Yu et al. | |
| 7,218,763 B2 * | 5/2007 | Belykh et al. | 382/128 |
| 8,243,790 B2 * | 8/2012 | Leontaris et al. | 375/240.02 |
| 2004/0013310 A1 * | 1/2004 | Suino et al. | 382/240 |
| 2005/0193311 A1 * | 9/2005 | Das et al. | 714/753 |
| 2008/0137752 A1 | 6/2008 | He | |
| 2009/0052555 A1 | 2/2009 | Mak-Fan et al. | |
| 2010/0220794 A1 | 9/2010 | Zhou | |
| 2012/0082219 A1 | 4/2012 | Sun et al. | |

OTHER PUBLICATIONS

Karlsson, Linda S., "Spatio-Temporal Pre-Processing Methods for Region-of-Interest Video Coding", Sundsvall, Sweden, Mittuniversitetet, Mid Sweden University, 2007, pp. 1-133.
Sperr, Timothy S., "Investigating Low-Bitrate, Low-Complexity H.264 Region of Interest Techniques in Error-Prone Environments", Rochester Institute of Technology, Rochester, NY, Jul. 2011, pp. 1-127.

* cited by examiner

*Primary Examiner* — Ali Bayat
(74) *Attorney, Agent, or Firm* — KPPB LLP (57) ABSTRACT

Systems and methods for region of interest background smoothing & compression enhancement in accordance with embodiments of the invention are disclosed. In one embodiment, preprocessing video with a smoothing filter includes identifying a region of interest in a frame of video, determining an importance value for the region of interest, when the importance value satisfies a criterion, applying an intra frame smoothing filter to pixels within the region of interest, which includes dividing the specified region of interest into pairs of pixel groupings, where the pixel groupings in each pair are the same size and are adjacent to each other, calculating the difference between the average luminance of the pixels within each pixel grouping, when the calculated difference is less than a predetermined amount: calculating the average luminance for all pixels in the pixel groupings, and assigning the calculated average luminance to all pixels within the pixel groupings.

17 Claims, 7 Drawing Sheets

SYSTEMS AND METHODS FOR REGION OF INTEREST BACKGROUND SMOOTHING AND COMPRESSION ENHANCEMENT

CROSS-REFERENCE TO RELATED APPLICATIONS

The current application claims priority to U.S. Provisional Patent Application Ser. No. 61/771,009, entitled "Systems and Methods for Region of Interest Background Smoothing & Compression Enhancement" filed Feb. 28, 2013. The disclosure of U.S. Provisional Patent Application Ser. No. 61/771,009 is incorporated herein by reference in its entirety.

FIELD OF THE INVENTION

The present invention generally relates to video processing and more specifically to systems and methods for applying a preprocessing filter to video content based upon regions of interest before block-oriented encoding of the content.

BACKGROUND OF THE INVENTION

The amount of data required to store video can be reduced using video encoding. A number of standards have been developed to facilitate the encoding and sharing of video. H.264 is a block-oriented motion-compensation based codec standard developed by the Telecommunication Standardization Sector's Video Coding Experts Group together with the International Organization for Standardization (ISO), International Electro technical Commission (IEC) and Moving Picture Experts Group (MPEG). H.264 includes a number of features that generally allow it to encode video effectively and provide more flexibility for applications in a wide variety of network environments.

Among the many features of H.264 is the ability to divide up an image into slice groups that define regions of an image. Each slice group can also be divided into several slices that are each a sequence of macroblocks. A macroblock is an image compression component that defines a still image or video frame as two or more blocks of pixels. These macroblocks can be processed in a scan order, such as left to right and top to bottom. Also, each slice can be decoded independently.

SUMMARY OF THE INVENTION

Systems and methods for region of interest background smoothing & compression enhancement in accordance with embodiments of the invention are disclosed. In one embodiment, a method of preprocessing video with a smoothing filter includes identifying a first region of interest in a first frame of video using a source encoder, determining an importance value for the identified first region of interest using the source encoder, when the importance value for the identified first region of interest satisfies a predetermined criterion, applying an intra frame smoothing filter to pixels within the region of interest using the source encoder, where applying an intra frame smoothing filter to pixels within a specified region of interest includes dividing the specified region of interest into pairs of pixel groupings, where the pixel groupings in each pair are the same size and are adjacent to each other, calculating the difference between the average luminance component value of the pixels within each pixel grouping in a pair of pixel groupings, when the calculated difference is less than a predetermined amount: calculating the average luminance component value for all pixels in the pair of pixel groupings, and assigning the calculated average luminance component value to all pixels within the pixel groupings that form the pair of pixel groupings.

In a further embodiment, applying an intra frame smoothing filter to pixels within a specified region of interest also includes calculating the difference between the average of a chrominance component value of the pixels within each pixel grouping in a pair of pixel groupings, when the calculated difference with respect to the chrominance component value is less than a predetermined amount: calculating the average chrominance component value for all pixels in the pair of pixel groupings, and assigning the calculated average chrominance component value to all pixels within the pixel groupings that form the pair of pixel groupings.

In another embodiment, an intra frame smoothing filter is applied to pixels within a region of interest when the importance value of the region of interest is below a predetermined importance threshold.

In a still further embodiment, the size of the pixel groupings utilized by the smoothing filter depend upon the importance value of the specific region of interest to which the smoothing filter is applied.

Still another embodiment includes identifying a second region of interest in the frame of video using the source encoder, where the second region of interest is more important than the first region of interest, determining an importance value of the second region of interest using the source encoder, where the determined importance value is higher than the importance value determined for the first region of interest, when the importance value for the identified second region of interest is below a predetermined importance threshold, applying a smoothing filter to pixels within the region of interest using the source encoder, where the pixel groupings of the smoothing filter applied to the second region of interest are smaller than the pixel groups of the smoothing filter applied to the first region of interest.

In a yet further embodiment, when the importance value for the identified first region of interest satisfies a predetermined criterion, applying an inter frame smoothing filter to pixels within the region of interest using the source encoder, where applying an inter frame smoothing filter to pixels within a specified region of interest, includes dividing the specified region of interest into pixel groupings, identifying pixel groupings in a second frame of video, where the pixel groupings in the second frame of video correspond to the pixel groupings in the specified region of interest in the first video frame, calculating the difference between the average luminance component value of each pixel grouping within the specified region of interest within the first frame of video and the corresponding pixel group within the second frame of video, when the calculated difference for a given pixel grouping within the specified region of interest within the first frame of video and the corresponding pixel group within the second frame of video is less than a predetermined amount: calculating the average luminance component value for the pixels within the given pixel grouping within the specified region of interest within the first frame of video and the corresponding pixel group within the second frame of video, and assigning the calculated average luminance component value to all pixels within the given pixel grouping within the specified region of interest within the first frame of video and the corresponding pixel group within the second frame of video.

In yet another embodiment, applying an inter frame smoothing filter to pixels within a specified region of interest also includes calculating the difference between the average of a chrominance component value of the pixels within each pixel grouping within the specified region of interest within the first frame of video and the corresponding pixel group within the second frame of video, when the calculated difference for the average chrominance component value of a given pixel grouping within the specified region of interest within the first frame of video and the corresponding pixel group within the second frame of video is less than a predetermined amount: calculating the average chrominance component value for the pixels within the given pixel grouping within the specified region of interest within the first frame of video and the corresponding pixel group within the second frame of video, and assigning the calculated average chrominance component value to all pixels within the given pixel grouping within the specified region of interest within the first frame of video and the corresponding pixel group within the second frame of video.

In a further embodiment again, the first video frame is encoded using macroblocks, and dividing the region of interest into pairs of pixel groupings further comprises selecting pixel groupings corresponding to at least one macroblock.

In another embodiment again, a source encoder includes memory containing a source encoder application, and a processor, wherein the source encoder application configures the processor to: identify a first region of interest in a first frame of video, determine an importance value for an identified region of interest, when the importance value for the identified first region of interest satisfies a predetermined criterion, apply an intra frame smoothing filter to pixels within the region of interest, where applying an intra frame smoothing filter to pixels within a specified region of interest, comprises the encoder application configuring the processor to: divide the specified region of interest into pairs of pixel groupings, where the pixel groupings in each pair are the same size and are adjacent to each other, calculate the difference between the average luminance component value of the pixels within each pixel grouping in a pair of pixel groupings, when the calculated difference is less than a predetermined amount: calculate the average luminance component value for all pixels in the pair of pixel groupings, and assign the calculated average luminance component value to all pixels within the pixel groupings that form the pair of pixel groupings.

In a further additional embodiment, applying an intra frame smoothing filter to pixels within a specified region of interest also includes the source encoder application configuring the processor to: calculate the difference between the average of a chrominance component value of pixels within each pixel grouping in a pair of pixel groupings, when the calculated difference with respect to the chrominance component value is less than a predetermined amount: calculating the average chrominance component value for all pixels in the pair of pixel groupings, and assigning the calculated average chrominance component value to all pixels within the pixel groupings that form the pair of pixel groupings.

In another additional embodiment, the source encoder application configures the processor such that an intra frame smoothing filter is applied to pixels within a region of interest when the importance value of the region of interest is below a predetermined importance threshold.

In a still yet further embodiment, dividing the region of interest into pairs of pixel groupings also includes the source encoder application configuring the processor to select the number of pixels within the pixel groupings based upon the importance value of the region of interest.

In still yet another embodiment, the source encoder application configures the processor such that the size of the pixel groupings utilized by the smoothing filter depend upon the importance value of the specific region of interest to which the smoothing filter is applied.

In a still further embodiment again, when the importance value for the identified first region of interest satisfies a predetermined criteria, the source encoder application configures the processor to apply an inter frame smoothing filter to pixels within the region of interest using the source encoder, where applying an inter frame smoothing filter to pixels within a specified region of interest includes the source encoder application configuring the processor to: divide the specified region of interest into pixel groupings, where each pixel grouping is the same size, identify pixel groupings in a second frame of video, where the pixel groupings in the second frame of video correspond to the pixel groupings in the specified region of interest, calculate the difference between the average luminance component value of each pixel grouping within the specified region of interest and the corresponding pixel group within the second frame of video, when the calculated difference for a given pixel grouping within the specified region of interest and the corresponding pixel group within the second frame of video is less than a predetermined amount, the source encoder application configures the processor to: calculate the average luminance component value for the pixels within the given pixel grouping within the specified region of interest and the corresponding pixel group within the second frame of video, and assign the calculated average luminance component value to all pixels within the given pixel grouping within the specified region of interest and the corresponding pixel group within the second frame of video.

In still another embodiment again, applying an inter frame smoothing filter to pixels within a specified region of interest also includes the source encoder application configuring the processor to: calculate the difference between the average of a chrominance component value of pixels within each pixel grouping within the specified region of interest within the first frame of video and the corresponding pixel group within the second frame of video, when the calculated difference for the average chrominance component value of a given pixel grouping within the specified region of interest and the corresponding pixel group within the second frame of video is less than a predetermined amount, the source encoder application configures the processor to: calculate the average chrominance component value for the pixels within the given pixel grouping within the specified region of interest and the corresponding pixel group within the second frame of video, and assign the calculated average chrominance component value to all pixels within the given pixel grouping within the specified region of interest and the corresponding pixel group within the second frame of video.

In a still further additional embodiment, the video frame is encoded using macroblocks, and dividing the region of interest into pairs of pixel groupings also includes selecting pixel groupings corresponding to at least one macroblock.

DETAILED DESCRIPTION OF THE DRAWINGS

Turning now to the drawings, systems and methods for region of interest background smoothing and compression enhancement in accordance with embodiments of the invention are illustrated. High compression of image and video content can result in blocking and other compression artifacts when the content is decoded and viewed. Artifacts can be harsh and distracting to a user's viewing experience.

Block-oriented video codecs such as H.264 typically process a frame of video in units of a macroblock (16×16 pixels). Motion prediction is performed on an input frame to generate residual macroblocks. Each residual macroblock is transformed using a block transform such as a 4×4 or 8×8 integer transform or discrete cosine transform and the resulting transform coefficients are quantized to give a set of quantized transform coefficients. The coefficients are reordered and entropy encoded and included in the compressed bitstream.

Quantization typically involves dividing each transform coefficient by an integer value using a quantization matrix or quantization parameter. Setting high values in the quantization matrix or quantization parameter means that more coefficients are rounded to zero, resulting in high compression at the expense of image quality. Because of the loss in precision due to high quantization, slightly changing light conditions or slight color variations in the source content can result in distortions such as blocking artifacts in the decoded content.

In many embodiments of the invention, a preprocessing filter is applied to smooth out differences in brightness or color that may be the source of blocking artifacts. A filter can average the luminance (luma) and/or the chrominance (chroma) components of pixels to affect the brightness and/or color levels. In various embodiments of the invention, a filter averages the luma and/or chroma components of groups of pixels, where a group of pixels can be of a certain shape (square, rectangular, etc.) and/or can be selected at the macroblock level (all pixels belonging to certain macroblocks in a certain shape). In several embodiments, the filter is an intra frame filter that affects pixels in one frame. In a number of embodiments, the filter is an inter frame filter that affects pixels across two or more adjacent frames.

In a number of embodiments, different regions within a frame of video are assigned different levels of importance or importance values and a preprocessing filter is applied to portions of the content based upon the region(s) of interest and the importance of the region(s). Based upon the importance value assigned to each region, a video encoder can preprocess pixels with a smoothing filter and limit preprocessing to regions with certain importance values as will be discussed further below. In many embodiments, a filter can be chosen for regions with an importance value indicating low importance where the filter selects bigger groups of pixels and thereby reduces precision.

Regions of interest are generally regions within a video frame containing visual information that is important to a viewer. Regions of interest within a frame of video and/or video sequence can be determined manually by a user or automatically by an automated region of interest detection process. In several embodiments, automated detection of regions of interest is performed by identifying moving foreground objects as regions of interest within a sequence of video frames. In many embodiments, higher importance values are assigned to regions of interest relative to background information and/or other portions of the video that are determined to have lower importance to the viewer.

Although certain embodiments are discussed above, there are various ways of utilizing smoothing filters to preprocess video content with regions of interest in accordance with many embodiments of the invention. System architectures that implement preprocessing using smoothing filters on regions of interest in video encoding are discussed in greater detail below.

System Architecture

Figure 1:
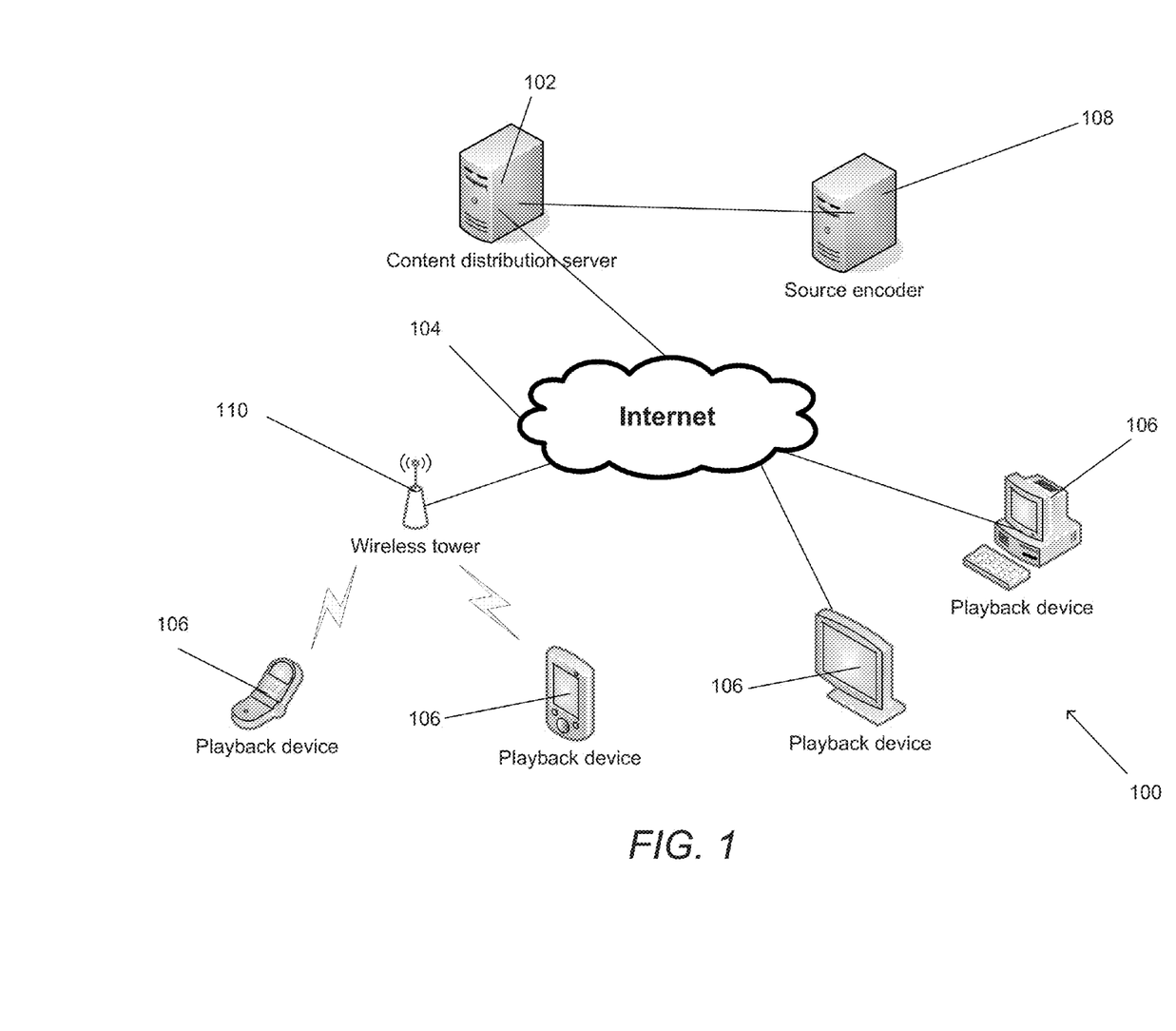
FIG. 1 is a system diagram of a video distribution system in accordance with an embodiment of the invention.

Video encoded in accordance with many embodiments of the invention can be transmitted to playback devices via the Internet. A video distribution system in accordance with an embodiment of the invention is illustrated in FIG. 1. The system 100 includes a number of different playback devices 106 connected with a content distribution server 102 over the Internet 104. A number of playback devices 106 communicate wirelessly with a cellular data network 110 to connect to the Internet 104. A source encoder 108, configured to encode video distributed from the content distribution server 102, is connected with the content distribution server 102. The source encoder 108 can be configured to encode video with at least one region of interest rated with a degree of importance. The playback devices 106 can include playback processes configured to decode encoded video from the source encoder 108. Thereby, encoding, decoding and transfer of a video stream from the source encoder 108 to a playback device 106 can occur. Although video transmitted to playback devices via the internet is mentioned above, video can be transmitted to playback devices in any manner as appropriate to specific applications in accordance with many embodiments of the invention, including over a local access network or by removable memory, such as a CD-ROM.

Figure 2A:
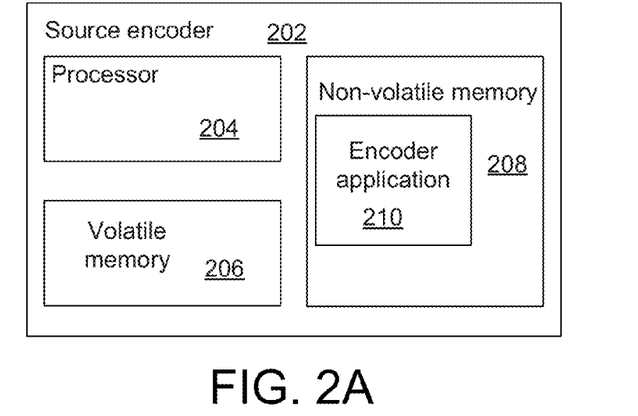
FIG. 2A illustrates a source encoder in accordance with an embodiment of the invention.

Source encoders in accordance with many embodiments of the invention can load an encoder application as machine readable instructions from memory or other storage. A source encoder in accordance with an embodiment of the invention is illustrated in FIG. 2A. The source encoder 202 includes a processor 204, volatile memory 206 and non-volatile memory 208 that includes an encoder 210. In the illustrated embodiment, the non-volatile memory 208 is a machine readable media that is utilized to store the machine readable instructions that configure the processor 204. The non-volatile memory 208 contains an encoder application 210, which is utilized to configure the processor 204 to encode video.

Figure 2B:
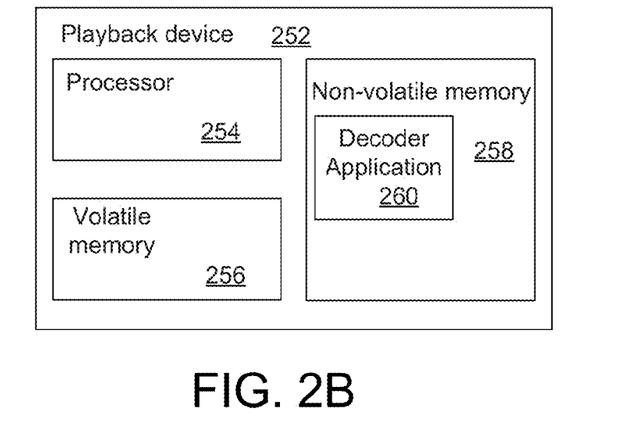
FIG. 2B illustrates a playback device in accordance with an embodiment of the invention.

Similarly, playback devices in accordance with many embodiments of the invention can load a decoder application as machine readable instructions from memory. A playback device in accordance with an embodiment of the invention is illustrated in FIG. 2B. The playback device 252 includes a processor 254, volatile memory 256 and non-volatile memory 258 that includes a decoder application 260. In the illustrated embodiment, the non-volatile memory 258 is a machine readable media that is utilized to store the machine readable instructions that configure the processor 254. Here, the non-volatile memory 258 contains the instructions of a decoder application 260, which can be utilized to configure the processor 254 to decode video. In many embodiments, a decoder application can be loaded from any kind of memory or storage device including volatile memory in accordance with many embodiments of the invention.

Figure 2C:
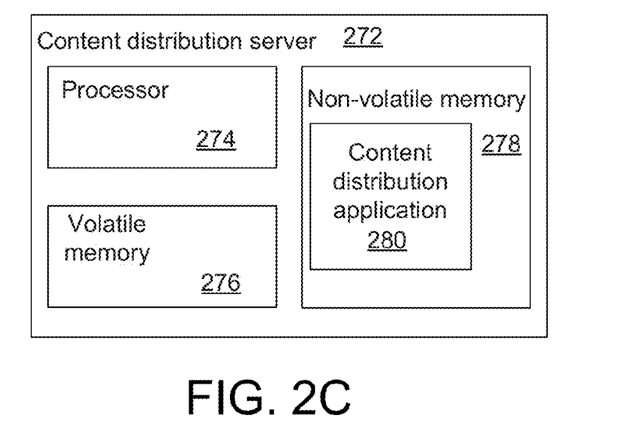
FIG. 2C illustrates a content distribution server in accordance with an embodiment of the invention.

Likewise, content distribution servers in accordance with many embodiments of the invention can load a content distribution application as machine readable instructions from memory. A content distribution server in accordance with an embodiment of the invention is illustrated in FIG. 2C. The content distribution server 272 includes a processor 274, volatile memory 276 and non-volatile memory 278 that includes a content distribution application 280. In the illustrated embodiment, the non-volatile memory 278 is a machine readable media that is utilized to store the machine readable instructions that configure the processor 274. Here, the non-volatile memory 278 contains the instructions of a content distribution application 280, which can be utilized to configure the processor 274 to distribute video. In many embodiments, a content distribution application can be loaded from any kind of memory or storage device including volatile memory in accordance with many embodiments of the invention.

Although a video distribution system is described above with respect to a specific source encoder, content distribution server and playback devices, any of a variety of encoding, transmitting or decoding systems can be utilized in the encoding, decoding and transmission of video as appropriate to specific applications in accordance with many embodiments of the invention. Assignment of importance values in accordance with embodiments of the invention are discussed below.

Assigning Importance Values

Source encoders in accordance with many embodiments of the invention utilize information concerning the relative importance of different regions of video frames to prioritize the application of error propagation reduction encoding processes to different regions of a video frame during encoding. Important regions can be identified using region of interest detection processes. Each region of interest can be assigned an importance value. In block based encoding, importance values can be assigned to different slice groups corresponding to the regions of interest. Different error propagation reduction processes can then be applied to each slice group based upon the importance value assigned to the slice group.

Figure 3:
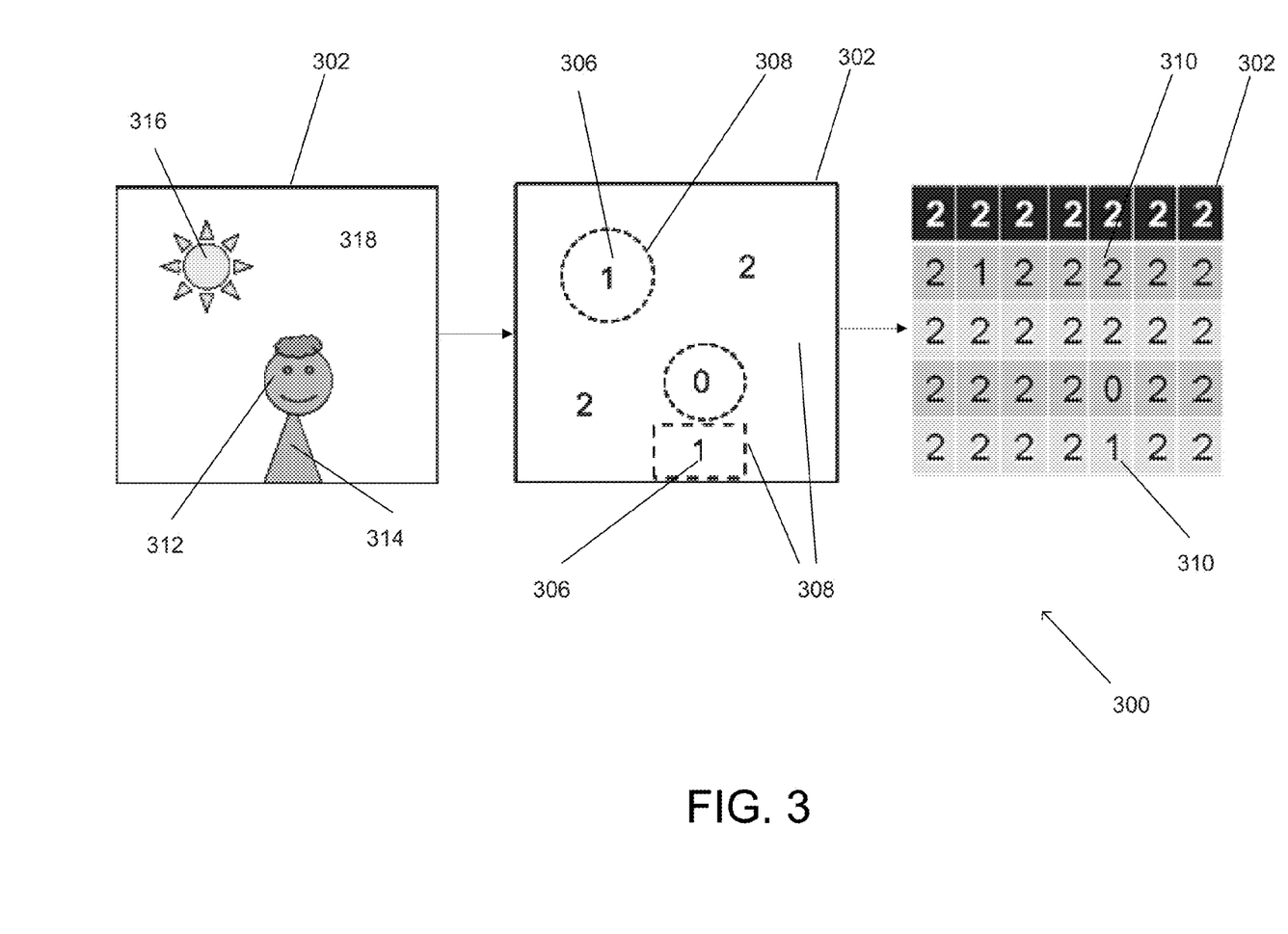
FIG. 3 conceptually illustrates a process for identifying regions of interest within a frame of video and assigning relative importance to the pixels within the encoded frame of video based upon the region of interest in accordance with an embodiment of the invention.

A diagram conceptually illustrating a process of determining regions of interest within a video frame and assigning importance values to slice groups within the frame for use during the encoding and decoding of the frame in accordance with an embodiment of the invention is shown in FIG. 3. The diagram 300 includes a video frame 302 including regions of interest 308 are identified and assigned importance values 306, where 0 labels the most important region and 2 labels the least important region. Each region of interest 308 that corresponds to one or more slice groups 310 in the encoded frame of video. The importance values assigned to each region in the video frame can be transferred to corresponding slice groups in the video frame. In the illustrated embodiment, the video frame 302 can be divided into three different regions of interest where the individual's head 312 is the most important region, the individual's body 314 and the sun 316 are assigned a lower importance value and the background 318 of the image is assigned the lowest importance value. The video frame 302 can then be represented by slice groups 310 with associated importance values 306. Importance values can also be represented as a percentage where a higher percentage indicates greater importance. In the embodiment illustrated in FIG. 3, the values of 0, 1, and 2 can be replaced with 50%, 15%, and 5% respectively without loss of generality. In many embodiments, foreground objects is assigned an importance percentage in the range of 50-100%, the most important foreground object is assigned an importance percentage of 100%, and/or the background of a video frame is assigned an importance value of less than 30%. In other embodiments, any of a variety of approaches and scoring scales can be used in scoring the importance of regions within a frame of video.

There are many processes that can be utilized to identify regions of interest in video. Manual processes can be utilized, such as where a user manually tags a region of interest or utilizes a user eye tracking device. Automated processes such as content recognition systems can also be used, such as by defining a region of interest to be an area of greater contextual complexity or movement in a video. Still other automated region of interest processes may define a region of interest through detection of object boundaries or contours that fall under certain criteria such as size, shape or amount of movement. Although certain region of interest detection processes are discussed above, any kind of detection of a region of interest to a user in accordance with embodiments of the invention may be made. Background smoothing using an intra frame filter and importance values of a region of interest in accordance with embodiments of the invention is discussed below.

Background Smoothing Using an Intra Frame Filter

Often, background areas in a video scene are uniform in color and/or contain less detail that a viewer would notice. Background areas and other less critical portions of a video can be designated as regions of interest with low importance values. Under some compression schemes, regions of interest with low importance values are subjected to higher compression by increasing the quantization parameters applied to those regions. The increased quantization can result in exaggerating small differences in brightness (luma) or color (chroma) to create blocking artifacts, where a small, gradual change over an area is distorted into solid "blocks" with distinct edges and stark differences in brightness or color from one to another. Blocking artifacts can be reduced by preprocessing on the source video to smooth the luma or chroma component values with a smoothing filter in regions of interest with low importance before it is encoded.

In many embodiments of the invention, a process for preprocessing video content before encoding by a block-oriented codec includes smoothing luma and/or chroma components of pixels in the content using a source encoder. In several embodiments, an intra frame filter is applied to average luma components of groups of pixels in regions of interest of a single frame of video. As will be discussed below, the strength of the filter can be varied by the number of pixels to be selected and averaged together. In various embodiments of the invention, a filter can average the luma component and/or chroma components (i.e. the two color difference components) of groups of pixels, where a group of pixels can be of a certain shape (square, rectangular, etc.) and/or can be selected at the macroblock level (all pixels belonging to certain macroblocks in a certain shape).

Figure 4:
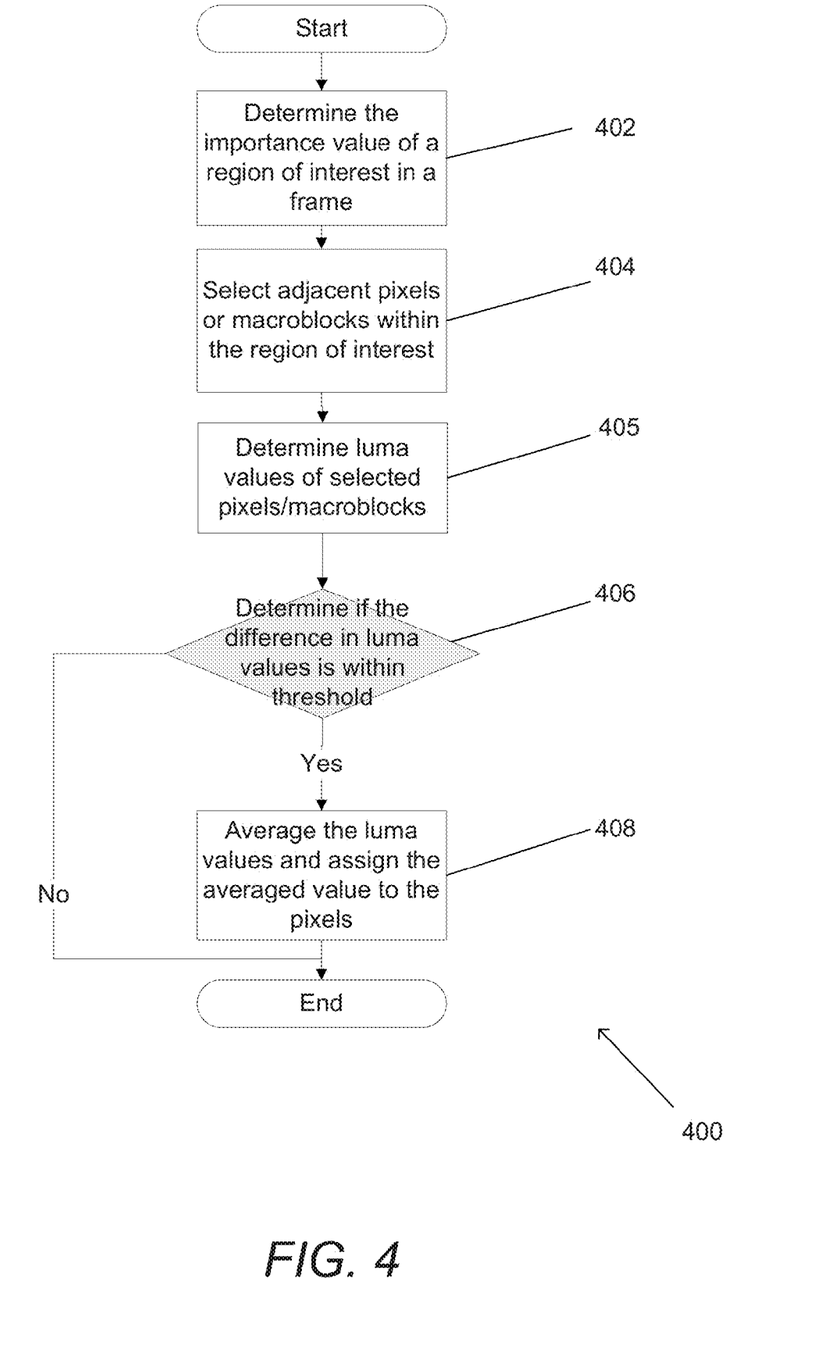
FIG. 4 illustrates a process for smoothing pixels in a region of interest using an intra frame filter in accordance with an embodiment of the invention.

A process for smoothing the luma of pixels in a region of interest using an intra frame filter in accordance with embodiments of the invention is illustrated in FIG. 4. The process includes determining (402) the importance value of a region of interest. Importance values may already be assigned to regions of interest. If not already assigned, importance values can be assigned based upon any of a variety of criteria, including by user selection or an automated process that analyzes the content of the region as discussed further above. In several embodiments of the invention, a threshold importance value is set such that the smoothing filter preprocessing is only performed on regions with importance below the threshold value. Turning off the filter on regions with high importance can improve performance and retain detail in those regions. In some embodiments of the invention, preprocessing is only performed on regions with an importance value below 30%. In other embodiments, any of a variety of criteria can be utilized to determine whether to perform preprocessing.

Two sets of adjacent pixels in the region of interest are selected (404). The number of pixels selected may depend on the importance of the region of interest. Low importance may indicate that the region is not particularly critical to the scene and less detail is necessary in the final presentation and bigger groups of pixels are selected and averaged together. Higher importance may indicate a greater desire for fidelity in the detail of the scene, and therefore groups of fewer pixels will be selected. In various embodiments of the invention, selections can include larger or smaller groups of pixels depending on the importance of the region. For example, a selection can include an 8 pixel×8 pixel partition of a macroblock, pixels within a single macroblock, pixels in a 2×1 or 1×2 group of macroblocks, or pixels in a 2×2 group of macroblocks. In some embodiments, an importance of 25% corresponds with selecting 8 pixel×8 pixel partitions of a macroblock. While particular configurations of selections are disclosed herein, any of a variety of arrangements may be utilized in various embodiments of the invention.

Figure 5:
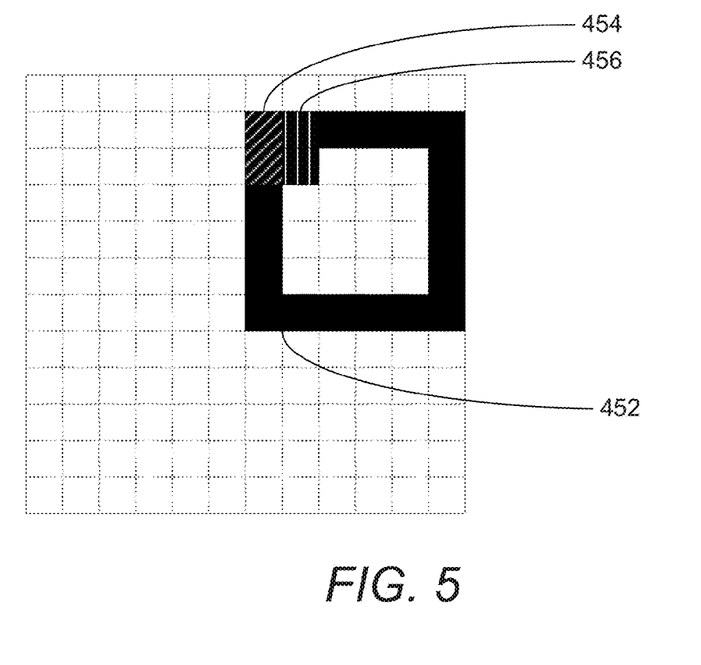
FIG. 5 illustrates a portion of a frame of video demonstrating one way in which pixels may be selected for filtering in accordance with embodiments of the invention.

FIG. 5 illustrates a portion of a frame of video demonstrating one way in which pixels may be selected for filtering in accordance with embodiments of the invention. The portion of the frame includes a region of interest denoted by the boundary pixels 452. The upper left most 1×2 block of macroblocks 452 in the region of interest is the first selection and the next 1×2 block of macroblocks 456 adjacent to the right of block 454 is the second selection.

Referring again to FIG. 4, the values of the luma components of pixels in the first selection and second selection of macroblocks are determined (405) from the source data. The difference between the average of the luma of the first selection and the average of the luma of the second selection is calculated and compared to a threshold.

Thresholds for the difference in luma values can be set to limit the smoothing to conditions in which the light or color has only a slight change. For example, when a light is turned on in a scene, there is a sudden and drastic change in brightness from one frame to the next as the light illuminates a room. To allow such changes to be rendered properly, a threshold difference should be set such that a large change in brightness (as from a light being switched on) exceeds the threshold and is not processed by the filter. A threshold for this degree of change may be around 50%. In other embodiments, any of a variety of thresholds can be utilized. Similarly, a threshold may be desired to determine whether the color or lighting of the selected pixels is similar enough for smoothing between them to be meaningful. For example, portions of a uniformly colored wall may have slight differences in brightness due to the lighting in the room. After encoding, the slight differences may result in blocking artifacts that greatly exaggerate the differences. Changes of this degree can be in the range of 10 to 15%.

A determination (406) is made as to whether the difference in luma values is within the threshold. If the difference exceeds the threshold, processing of pixels in the selected macroblocks is not performed. If the difference does not exceed the threshold, the values of luma components of all pixels in the selected macroblocks are averaged together (408). The average is assigned to pixels in all macroblocks that were selected. In other embodiments of the invention, the filter may instead remove frequencies in the frequency domain after the macroblocks are subjected to a DCT or integer transform in the block-oriented encoding process. This would have a similar effect to taking the average.

Figure 6:
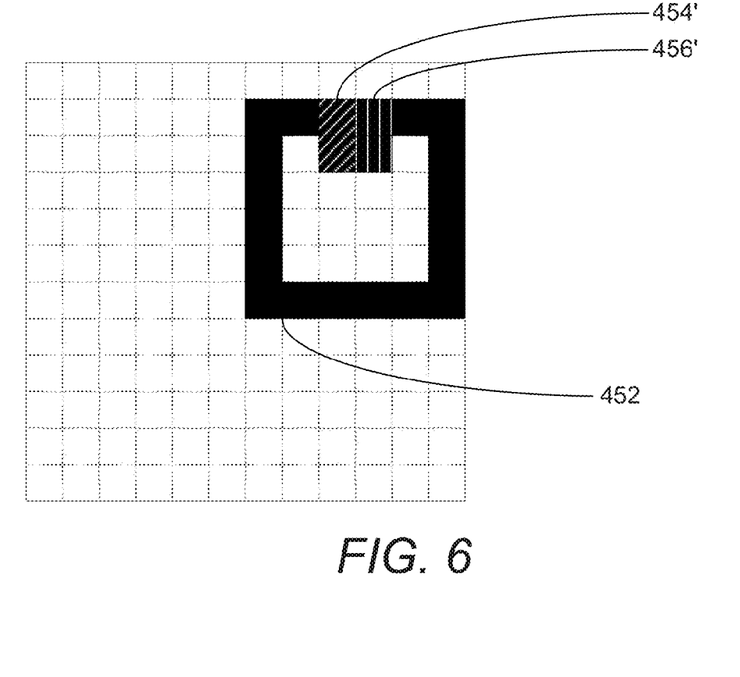
FIG. 6 illustrates a process for smoothing pixels in a region of interest using an inter frame filter in accordance with an embodiment of the invention.

The process can be repeated with selections of pixels in other adjacent macroblocks within the region of interest. FIG. 6 illustrates the portion of a frame illustrated in FIG. 5 demonstrating a second selection of pixels for filtering in accordance with embodiments of the invention. The two selections 454' and 456' are directly to the right of the first selections 454 and 456. Pixels may be selected in a systematic way to cover all macroblocks or pixels in a region of interest.

The process can also be repeated for other regions of interest. In addition, the process is not limited to be performed only on one region at a time. Provided adequate computing and memory resources, multiple sets of pixels in multiple regions may be compared and averaged simultaneously.

The process described above utilizes a filter that averages the luma components of pixels in the content. Similarly, a filter can be used that averages chroma components (e.g. each color difference component can be separately averaged) with appropriate thresholds that are set. Moreover, multiple filters can be applied simultaneously with each filter applied to a different component. While a process for smoothing pixels in a region of interest using an intra frame filter is discussed above, smoothing filters using various arrangements of selected pixels and thresholds may be utilized in accordance with embodiments of the invention.

Background Smoothing Using an Inter Frame Filter

In several embodiments of the invention, a smoothing filter is applied to corresponding pixels in adjacent frames. The filter can operate in a manner similar to the intra frame filter discussed above, but where the first and second selections of pixels are in adjacent (i.e., consecutive) frames.

Figure 7:
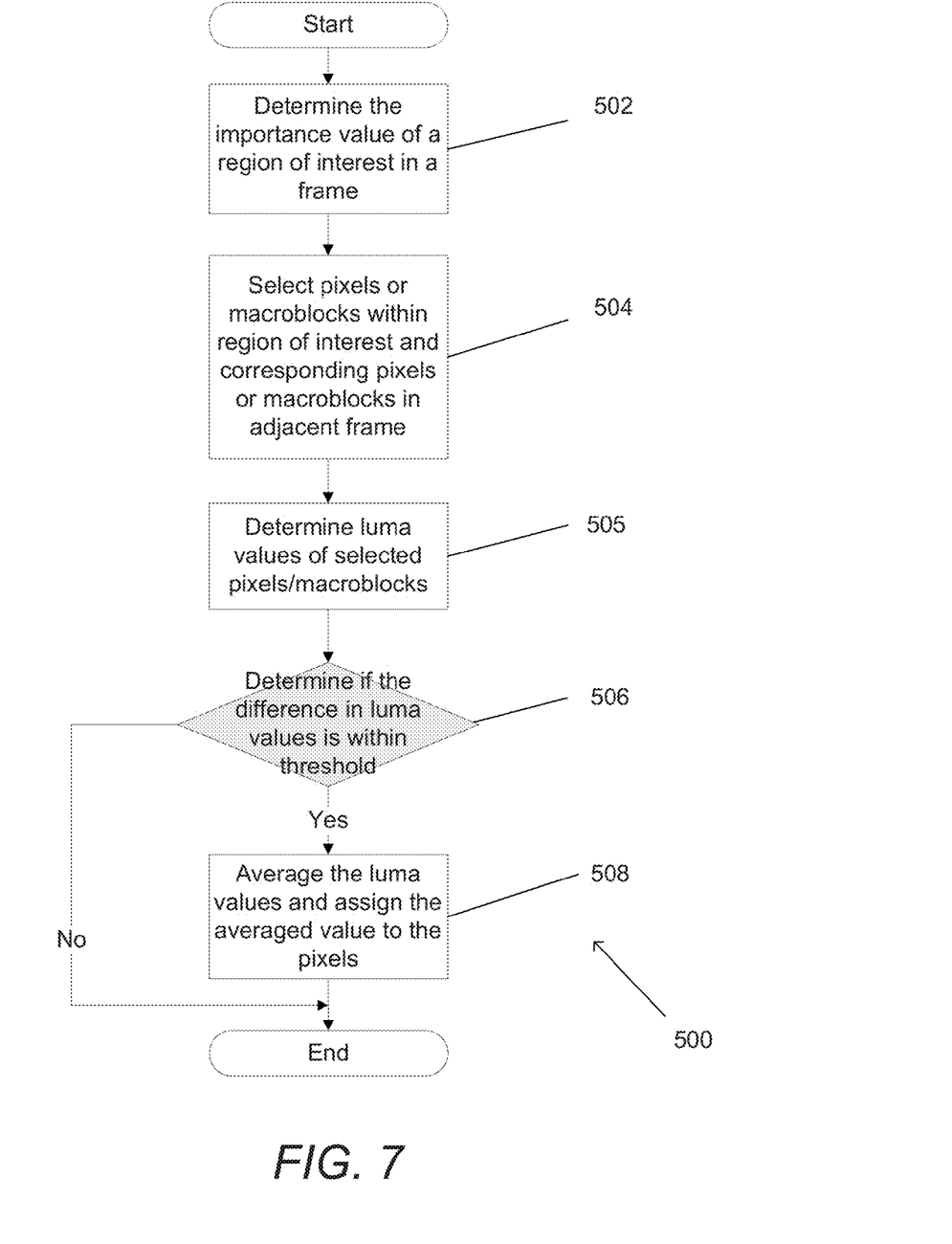
FIG. 7 is a flow chart illustrating a process for smoothing pixels in a region of interest using an inter frame filter in accordance with an embodiment of the invention.

A process for smoothing the luma of pixels in a region of interest using an inter frame filter in accordance with embodiments of the invention is illustrated in FIG. 7. The process includes determining (502) the importance value of a region of interest.

Figure 8A:
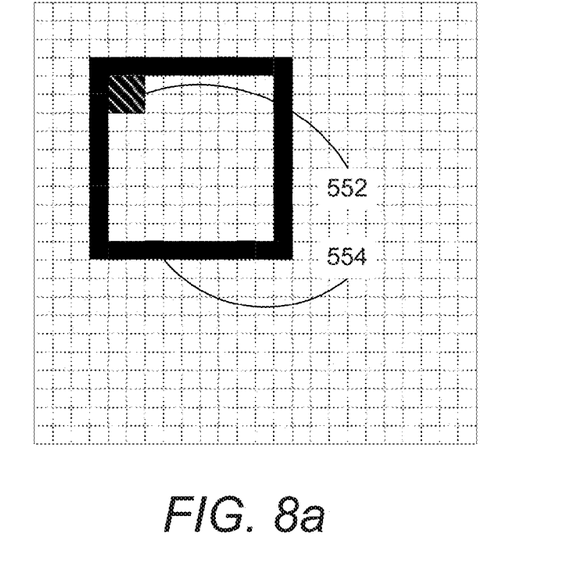
FIGS. 8a and 8b illustrate portions of frames of video demonstrating one way in which pixels may be selected for filtering in accordance with embodiments of the invention.
Figure 8B:
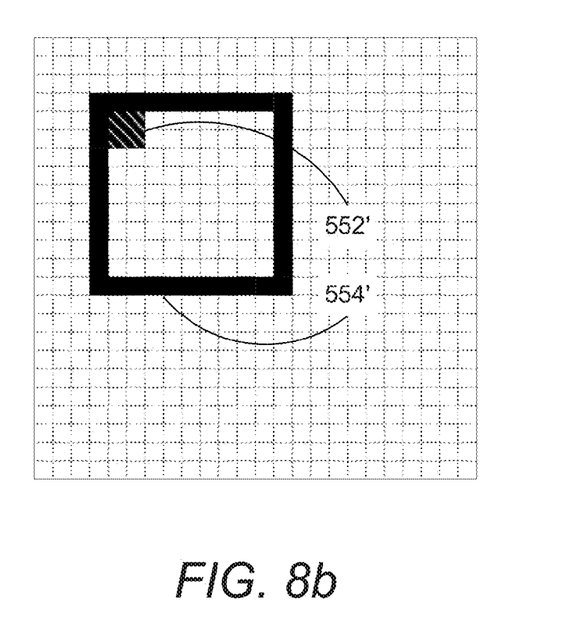

Two sets of pixels in the region of interest are selected (504). FIGS. 8a and 8b illustrate portions of frames of video demonstrating one way in which pixels may be selected for filtering in accordance with embodiments of the invention. The first selection is taken from a first frame as in FIG. 8a. The portion of the frame includes a region of interest denoted by the boundary pixels 554. The upper left most macroblock 552 in the region of interest 554 is the first selection. FIG. 8b illustrates a portion of the next frame in the sequence with the corresponding region of interest 554' where macroblock 552' corresponding to macroblock 552 in the previous frame is the second selection.

Referring again to FIG. 7, the values of the luma components of pixels in the first selection and second selection of macroblocks are determined (505) from the source data. The difference between the average of the luma of the first selection and the average of the luma of the second selection is calculated and compared to a threshold.

A determination (506) is made as to whether the difference in luma values is within the threshold. If the difference exceeds the threshold, processing of pixels in the selected macroblocks is not performed. If the difference does not exceed the threshold, the values of luma components of pixels in all the selected macroblocks are averaged together (508). The average is assigned to all pixels in the macroblocks that were selected.

The process can be repeated with selections of other pixels within the region of interest in a systematic way to cover all macroblocks or pixels in a region of interest.

While a process for smoothing pixels in a region of interest using an inter frame filter is discussed above, smoothing filters using various arrangements of selected pixels or pixels within macroblocks and thresholds may be utilized in accordance with embodiments of the invention. The effect of smoothing filters as discussed on producing encoding efficiency is described below.

Encoding Efficiency

Many block-oriented codecs such as H.264 utilize entropy encoding where redundancies, similarities, and patterns are exploited to compress information. Because the smoothing filters discussed above take the average values between pixels, the amount of differences in the content are reduced. Consequently, the content can be more efficiently encoded.

While the above description contains many specific embodiments of the invention, these should not be construed as limitations on the scope of the invention, but rather as an example of one embodiment thereof. It is therefore to be understood that the present invention may be practiced otherwise than specifically described, without departing from the scope and spirit of the present invention. Thus, embodiments of the present invention should be considered in all respects as illustrative and not restrictive.

What is claimed is:

1. A method of preprocessing video with a smoothing filter, the method comprising:
    identifying a first region of interest in a first frame of video using a source encoder;
    determining an importance value for the identified first region of interest using the source encoder;
    when the importance value for the identified first region of interest satisfies a predetermined criterion, applying an intra frame smoothing filter to pixels within the region of interest using the source encoder;
    wherein applying an intra frame smoothing filter to pixels within a specified region of interest, comprises:
        dividing the specified region of interest into pairs of pixel groupings, where the pixel groupings in each pair are the same size and are adjacent to each other;
        calculating the difference between the average luminance component value of the pixels within each pixel grouping in a pair of pixel groupings;
        when the calculated difference is less than a predetermined amount:
            calculating the average luminance component value for all pixels in the pair of pixel groupings; and
            assigning the calculated average luminance component value to all pixels within the pixel groupings that form the pair of pixel groupings.

2. The method of claim 1, wherein applying an intra frame smoothing filter to pixels within a specified region of interest, further comprises:
    calculating the difference between the average of a chrominance component value of the pixels within each pixel grouping in a pair of pixel groupings;
    when the calculated difference with respect to the chrominance component value is less than a predetermined amount:
        calculating the average chrominance component value for all pixels in the pair of pixel groupings; and
        assigning the calculated average chrominance component value to all pixels within the pixel groupings that form the pair of pixel groupings.

3. The method of claim 1, wherein an intra frame smoothing filter is applied to pixels within a region of interest when the importance value of the region of interest is below a predetermined importance threshold.

4. The method of claim 3, wherein the size of the pixel groupings utilized by the smoothing filter depend upon the importance value of the specific region of interest to which the smoothing filter is applied.

5. The method of claim 4, further comprising:
    identifying a second region of interest in the frame of video using the source encoder, where the second region of interest is more important than the first region of interest;
    determining an importance value of the second region of interest using the source encoder, where the determined importance value is higher than the importance value determined for the first region of interest;
    when the importance value for the identified second region of interest is below a predetermined importance threshold, applying a smoothing filter to pixels within the region of interest using the source encoder;
    wherein the pixel groupings of the smoothing filter applied to the second region of interest are smaller than the pixel groups of the smoothing filter applied to the first region of interest.

6. The method of claim 1, wherein:
    when the importance value for the identified first region of interest satisfies a predetermined criterion, applying an inter frame smoothing filter to pixels within the region of interest using the source encoder;
    wherein applying an inter frame smoothing filter to pixels within a specified region of interest, comprises:
        dividing the specified region of interest into pixel groupings;
        identifying pixel groupings in a second frame of video, where the pixel groupings in the second frame of video correspond to the pixel groupings in the specified region of interest in the first video frame;
        calculating the difference between the average luminance component value of each pixel grouping within the specified region of interest within the first frame of video and the corresponding pixel group within the second frame of video;
        when the calculated difference for a given pixel grouping within the specified region of interest within the first frame of video and the corresponding pixel group within the second frame of video is less than a predetermined amount:
            calculating the average luminance component value for the pixels within the given pixel grouping within the specified region of interest within the first frame of video and the corresponding pixel group within the second frame of video; and
            assigning the calculated average luminance component value to all pixels within the given pixel grouping within the specified region of interest within the first frame of video and the corresponding pixel group within the second frame of video.

7. The method of claim 6, wherein applying an inter frame smoothing filter to pixels within a specified region of interest, further comprises:
    calculating the difference between the average of a chrominance component value of the pixels within each pixel grouping within the specified region of interest within the first frame of video and the corresponding pixel group within the second frame of video;

when the calculated difference for the average chrominance component value of a given pixel grouping within the specified region of interest within the first frame of video and the corresponding pixel group within the second frame of video is less than a predetermined amount:

calculating the average chrominance component value for the pixels within the given pixel grouping within the specified region of interest within the first frame of video and the corresponding pixel group within the second frame of video; and assigning the calculated average chrominance component value to all pixels within the given pixel grouping within the specified region of interest within the first frame of video and the corresponding pixel group within the second frame of video.

8. The method of claim 1, wherein:
the first video frame is encoded using macroblocks; and
dividing the region of interest into pairs of pixel groupings further comprises selecting pixel groupings corresponding to at least one macroblock.

9. A source encoder, comprising:
memory containing a source encoder application; and
a processor, wherein the source encoder application configures the processor to:
identify a first region of interest in a first frame of video;
determine an importance value for an identified region of interest;
when the importance value for the identified first region of interest satisfies a predetermined criterion, apply an intra frame smoothing filter to pixels within the region of interest;
wherein applying an intra frame smoothing filter to pixels within a specified region of interest, comprises the encoder application configuring the processor to:
divide the specified region of interest into pairs of pixel groupings, where the pixel groupings in each pair are the same size and are adjacent to each other;
calculate the difference between the average luminance component value of the pixels within each pixel grouping in a pair of pixel groupings;
when the calculated difference is less than a predetermined amount:
calculate the average luminance component value for all pixels in the pair of pixel groupings; and
assign the calculated average luminance component value to all pixels within the pixel groupings that form the pair of pixel groupings.

10. The source encoder of claim 9, wherein applying an intra frame smoothing filter to pixels within a specified region of interest, further comprises the source encoder application configuring the processor to:
calculate the difference between the average of a chrominance component value of pixels within each pixel grouping in a pair of pixel groupings;
when the calculated difference with respect to the chrominance component value is less than a predetermined amount:
calculating the average chrominance component value for all pixels in the pair of pixel groupings; and
assigning the calculated average chrominance component value to all pixels within the pixel groupings that form the pair of pixel groupings.

11. The source encoder of claim 9, wherein the source encoder application configures the processor such that an intra frame smoothing filter is applied to pixels within a region of interest when the importance value of the region of interest is below a predetermined importance threshold.

12. The source encoder of claim 11, wherein dividing the region of interest into pairs of pixel groupings further comprises the source encoder application configuring the processor to select the number of pixels within the pixel groupings based upon the importance value of the region of interest.

13. The source encoder of claim 12, wherein the source encoder application configures the processor such that the size of the pixel groupings utilized by the smoothing filter depend upon the importance value of the specific region of interest to which the smoothing filter is applied.

14. The source encoder of claim 9, wherein:
when the importance value for the identified first region of interest satisfies a predetermined criteria, the source encoder application configures the processor to apply an inter frame smoothing filter to pixels within the region of interest using the source encoder;
wherein applying an inter frame smoothing filter to pixels within a specified region of interest, comprises the source encoder application configuring the processor to:
divide the specified region of interest into pixel groupings, where each pixel grouping is the same size;
identify pixel groupings in a second frame of video, where the pixel groupings in the second frame of video correspond to the pixel groupings in the specified region of interest;
calculate the difference between the average luminance component value of each pixel grouping within the specified region of interest and the corresponding pixel group within the second frame of video;
when the calculated difference for a given pixel grouping within the specified region of interest and the corresponding pixel group within the second frame of video is less than a predetermined amount, the source encoder application configures the processor to:
calculate the average luminance component value for the pixels within the given pixel grouping within the specified region of interest and the corresponding pixel group within the second frame of video; and
assign the calculated average luminance component value to all pixels within the given pixel grouping within the specified region of interest and the corresponding pixel group within the second frame of video.

15. The source encoder of claim 14, wherein applying an inter frame smoothing filter to pixels within a specified region of interest, further comprises the source encoder application configuring the processor to:
calculate the difference between the average of a chrominance component value of pixels within each pixel grouping within the specified region of interest within the first frame of video and the corresponding pixel group within the second frame of video;
when the calculated difference for the average chrominance component value of a given pixel grouping within the specified region of interest and the corresponding pixel group within the second frame of video is less than a predetermined amount, the source encoder application configures the processor to:
calculate the average chrominance component value for the pixels within the given pixel grouping within the specified region of interest and the corresponding pixel group within the second frame of video; and assign the calculated average chrominance component value to all pixels within the given pixel grouping within the specified region of interest and the corresponding pixel group within the second frame of video.

16. The source encoder of claim 9, wherein:

the video frame is encoded using macroblocks; and dividing the region of interest into pairs of pixel groupings further comprises selecting pixel groupings corresponding to at least one macroblock.

17. A non-transitory machine readable medium containing processor instructions, where execution of the instructions by a processor causes the processor to perform a process comprising:

identifying a first region of interest in a first frame of video;

determining an importance value for the identified first region of interest;

when the importance value for the identified first region of interest satisfies a predetermined criterion, applying an intra frame smoothing filter to pixels within the region of interest;

wherein applying an intra frame smoothing filter to pixels within a specified region of interest, comprises:

dividing the specified region of interest into pairs of pixel groupings, where the pixel groupings in each pair are the same size and are adjacent to each other;

calculating the difference between the average luminance component value of the pixels within each pixel grouping in a pair of pixel groupings;

when the calculated difference is less than a predetermined amount:

calculating the average luminance component value for all pixels in the pair of pixel groupings; and assigning the calculated average luminance component value to all pixels within the pixel groupings that form the pair of pixel groupings.

\* \* \* \* \*